(No Model.)

P. V. LAWSON & W. L. FIELD.
PULLEY.

No. 412,276. Patented Oct. 8, 1889.

Witnesses.
Geo. W. Fay
L. Batchelder

Inventors.
P. V. Lawson.
Wallace L. Field.
By their Atty. G. H. Albee.

UNITED STATES PATENT OFFICE.

P. V. LAWSON AND WALLACE L. FIELD, OF MENASHA, WISCONSIN.

PULLEY.

SPECIFICATION forming part of Letters Patent No. 412,276, dated October 8, 1889.

Application filed May 16, 1889. Serial No. 311,086. (No model.)

*To all whom it may concern:*

Be it known that we, P. V. LAWSON (P. V. is the entire first name) and WALLACE L. FIELD, citizens of the United States, residing at Menasha, in the county of Winnebago and State of Wisconsin, have invented a new and useful Improvement in Pulleys, of which the following is a specification.

Our invention relates to an improved separable pulley having a bent rim consisting of two semicircular sections of wood, a hub and pulley-arms of metal, those for each half of the pulley being cast integral, and to the peculiar formation of said hub and arms and the manner of connecting the arms to the rim-sections, and also the two sections of the pulley to each other and clamping them upon a shaft, whereby a key or set-screw is dispensed with; and the objects of our improvement are to produce as an article of manfacture a pulley of light weight and great strength, of a neat and artistic design, and which is adapted for general use within certain limits relative to its diameter in the various manufacturing establishments.

We design this pulley to fill an intermediate place in a line of pulleys of a separable character, those of ten inches or less in diameter being formed solid of wood, and those of twenty inches or more in diameter having an iron hub, six or more wood arms located at equal distances from each other, and a bent rim of wood secured upon the ends of the arms. We attain these objects by the method of construction illustrated in the accompanying drawings, in which—

Figure 1:
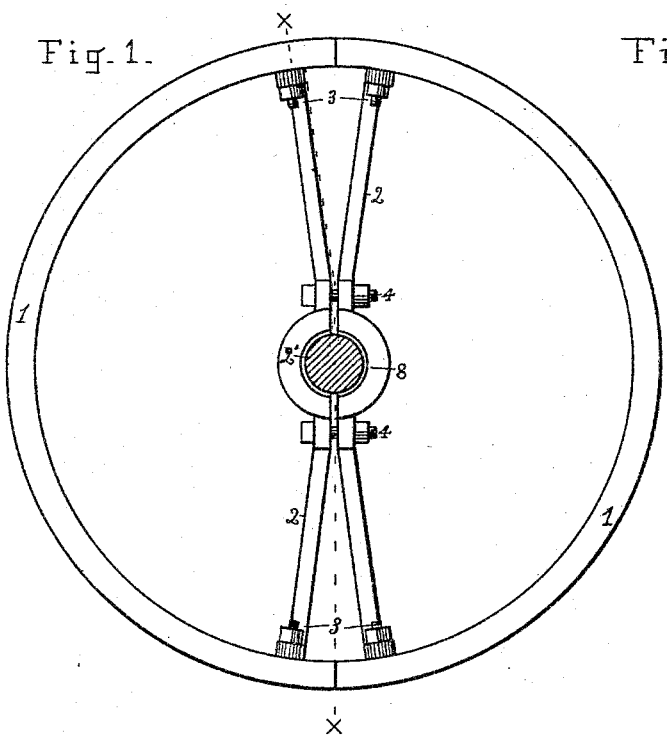
Figure 2:
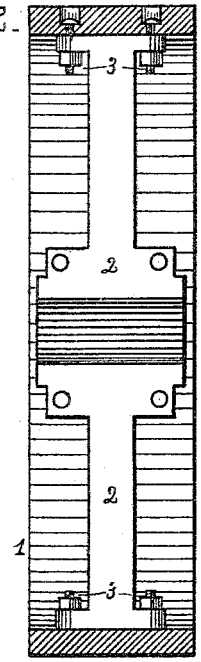
Figure 3:
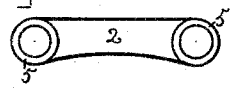
Figure 5:
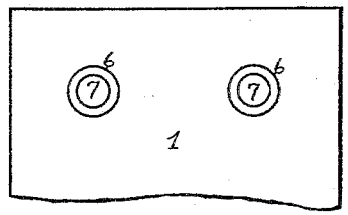
Figure 6:
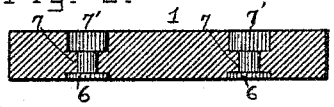
Figure 4:
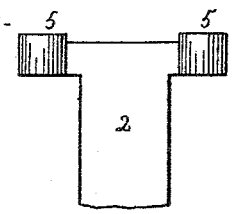

Figure 1 is an end elevation of the pulley and the shaft to which it is clamped, the shaft being in section. Fig. 2 is a vertical section of the pulley upon the line $xx$ of Fig. 1. Figs. 3 and 4 are detail views upon an enlarged scale, giving, respectively, an end and side view of the outer end of the pulley-arms; and Figs. 5 and 6, plan and transverse sections, respectively, upon a like scale, of that portion of the end of the pulley-rim to which the aforesaid arm ends are attached.

Similar figures of reference indicate like parts in the several views.

1 represents the pulley-rim; 2, the hub and pulley-arms, which consist of a single casting for each half of the dulley; 2', a shaft upon which the pulley is secured; 3, bolts connecting the rim-section to the pulley-arms; 4, bolts connecting the two halves of the pulley to each other; 5, circular ribs projecting slightly above the surface of the outer extremity of the arms; and 6, sockets formed in the inner surface of the pulley-rim, into which the aforesaid ribs are inserted.

7 is a hole bored concentric with the aforesaid socket to the outer surface of the rim, and which has a counterbore therein for receiving the heads of the bolts 3; 8, a bushing of paper or other slightly-elastic material, (paper being preferred,) which is inserted within the bore of the pulley-hub, and is clamped between the sections of said hub and the shaft to which the pulley is applied.

In the formation of this pulley the hub and arm-pieces being cast, they are drilled for receiving the bolts 3 and 4, the rim-sections, which are composed of a single thickness of wood, the grain thereof being in the direction of the circumference of the pulley bent to the required circle and cut to the length required, the sockets 6, holes 7, and counterbores 7' formed therein, when they are bolted to the arms, as shown. The two halves of the pulley are then bolted together and clamped upon an arbor, the bushing 8 having been inserted, as before described, when the arbor is placed in a lathe and a pulley turned to the desired diameter and width of face. It is then removed from the arbor, and may be painted and varnished and marked with its diameter and width of face, thus completing the pulley. The extremities of the arms being provided with the circular ribs 5, and the rims having the sockets 6 for receiving said ribs, the rims are firmly secured thereto, when the ribs are inserted therein and the bolts 3 tightened upon them. Each end of the arms we provide with two, and for wide-faced pulleys an additional number of said circular ribs, for each of which a socket is formed in the pulley-rim, a bolt passing through each rib and socket and connecting the rim and arms. The rim-sections being connected to the arms near the ends of said sections, a true circle of the pulley is preserved.

We are aware that it is not new to make a separable pulley having a bent wood rim, and pulleys have also been made wherein the hub and pulley-arms were formed integral, which we do not claim, broadly, as our invention; but we believe a pulley has not been made before our invention composed of a metallic hub and arms cast integral and having a bent rim secured thereto, constructed of the material and in the manner described.

Therefore what we claim, and desire to secure by Letters Patent, is—

1. As an improved article of manufacture, a separable pulley divided longitudinally of its bore into two equal sections, the hub and arms of each section being of metallic formation cast integral, and the ends of said arms terminating near the aforesaid dividing-line at a distance from each other slightly greater than the distance between their respective hub-sections, and the arm ends of each section being each provided with circular ribs, a bent wood rim having sockets therein adapted to receive said ribs, the bolts 3, concentric with the ribs and connecting said arms and rim-sections, and the clamp-bolts 4 through the hub-sections, whereby the pulley-sections may be connected one to the other and said hub-sections drawn toward each other and clamped upon a shaft, substantially as described.

2. In a separable pulley divided longitudinally of its bore into two equal sections and having the hub and arms of each section of metallic formation cast integral, and the ends of said arms terminating near the aforesaid dividing-line at a distance from each other slightly greater than the distance between their respective hub-sections, and the arm ends of each section being each provided with circular ribs, and a bent rim formed of a single thickness of wood, having sockets therein adapted to receive said ribs, the bolts 3, concentric with the ribs and connecting the arms and rim-sections, and the clamp-bolts 4 through the hub-sections, whereby the pulley-sections may be connected one to the other and the hub-sections drawn toward each other and clamped upon a shaft, and in combination a bushing of paper or other slightly-elastic material interposed between said hub-sections and shaft, substantially as described.

P. V. LAWSON.
WALLACE L. FIELD.

Witnesses:
A. V. RICHARDSON,
MARK MOULTON.